Samuel Vanstone
Assignor to
Geo. & Jas. Chatterton.
Imp'd. Fastening for R.R. Joints.
118075  Fig. 1.  PATENTED AUG 15 1871
Fig. 2.
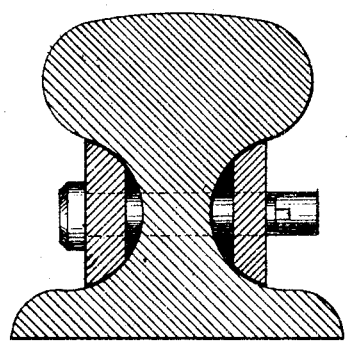
Fig. 3.
Fig. 4.
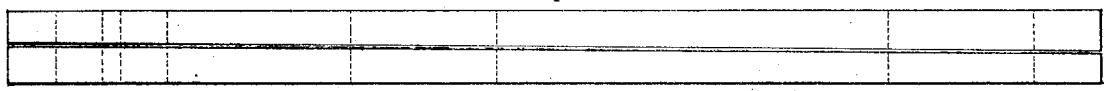
Fig. 5.
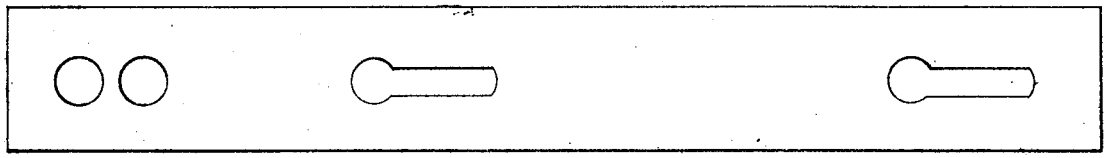
Fig. 6.
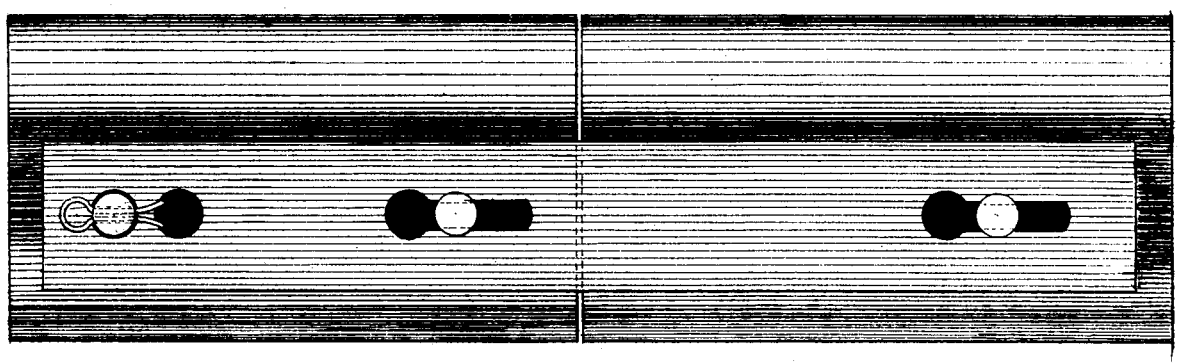
Witnesses.
Charles H. Smith
Philip B. Stines Jr.
Inventor.
Samuel Vanstone

UNITED STATES PATENT OFFICE.

SAMUEL VANSTONE, OF NORTH PROVIDENCE, RHODE ISLAND, ASSIGNOR TO GEORGE CHATTERTON AND JAMES CHATTERTON, OF SAME PLACE.

IMPROVEMENT IN DEVICES FOR LOCKING-BOLTS.

Specification forming part of Letters Patent No. 118,075, dated August 15, 1871.

*To all whom it may concern:*

Be it known that I, SAMUEL VANSTONE, of North Providence, in the county of Providence and State of Rhode Island, have invented a new and useful Device for Fastening the Joints of Rails, of which the following is a specification, in connection with the accompanying drawing.

Figure 1 is a section of the rail with the improved fastening applied. Figs. 2 and 3 are bolts used in the improved fastening. Fig. 4 is a sectional view of two tapering plates applied to the same side of the rail. Fig. 5 shows the outer surface of the fish-plate. Fig. 6 shows a side view of the rail-joint with the improved fastening applied.

Experience has shown that when rails are tied by plates, fastened with bolts and nuts, the heavy strain and vibration caused by passing trains so soon wears and loosens the bolt and nut that constant labor is required to replace and tighten them. The object of my invention, therefore, is to avoid the use of nuts on the bolts of rail-couplings, which are so easily turned by the vibration of the rails.

This I accomplish in the following manner: For each joint I have two tapering fish-plates, the reverse ends of each being thicker than the opposite ends, of proper length, and fitting the curvature of the rail. One of these, having round holes of the size of the bolts, is applied to one side of the joint of the rails, and the other, having one or more round holes, and one or more key-hole slots, as in Fig. 5, is placed on the opposite side of the joint. Bolts, as in Fig. 2, having a neck smaller than the shaft, and a shoulder at the end, or of any other equivalent construction, are inserted through the holes in the iron plate, through corresponding holes drilled in the rails, and through the eyes of the key-hole slots in the opposite plate. This plate is then pushed up so as to bring the neck of the bolt within the jaws of the key-hole slot and also one of the round holes opposite to the corresponding hole of the opposite plate and rail, the holes and slots being punched at proper distances for the purpose. The bolt, as in Fig. 3, with the slot in the shaft, is then inserted. This bolt is of such length as to bring the slot through both plates, where it is fastened by a cotter.

The advantage of the reverse tapering plates is that upon being pushed up, as above described, they serve as wedges to keep the rails firm and secure, and at the same time preserve the same thickness throughout for the bolts. The same result, however, may be accomplished by using an ordinary plate on one side, with two reverse tapering plates, as in Fig. 4, on the opposite side, or one such plate arranged with wedge-lipped slots.

When these plates are new, the bolt, Fig. 3, should be put through the first hole, and then in case the plates, after a time, wear away, the plates can be pushed up and the bolt put through the second hole, making the joint tight again, with a moment's labor and without expense. As the holes in the rails are usually oblong in shape, a sufficient provision will thus be made for expansion and contraction.

What I claim as my invention, and desire to secure by Letters Patent, is—

The fastening of rail or other similar joints by means of the tapering plates, or the equivalent straight plates with the tapering slots, and bolts running into key-hole slots, in combination with the single-slot bolt and cotter, substantially as described.

SAMUEL VANSTONE.

Witnesses:
CHARLES H. SMITH,
PHILIP B. STINESS, Jr.